(12) United States Patent
Steidl et al.

(10) Patent No.: US 6,458,451 B1
(45) Date of Patent: Oct. 1, 2002

(54) FLAT COMPOSITE BODY, ESPECIALLY A MOTOR VEHICLE BODY ELEMENT

(75) Inventors: Matthias Steidl, Ingolstadt (DE); Karl Bauer, Friedberg (DE)

(73) Assignee: Audi AG (DE)

( * ) Notice: Subject to any disclaimer, the term of this patent is extended or adjusted under 35 U.S.C. 154(b) by 0 days.

(21) Appl. No.: 09/646,298

(22) PCT Filed: Mar. 12, 1999

(86) PCT No.: PCT/EP99/01648
§ 371 (c)(1),
(2), (4) Date: Jan. 8, 2001

(87) PCT Pub. No.: WO99/50126
PCT Pub. Date: Oct. 7, 1999

(30) Foreign Application Priority Data

Mar. 27, 1998 (DE) .......................................... 198 13 592

(51) Int. Cl.$^7$ ................................................ B32B 5/14
(52) U.S. Cl. ..................... 428/308.4; 442/370; 442/371; 442/378
(58) Field of Search ................................ 442/370, 371, 442/378; 428/308.4

(56) References Cited

U.S. PATENT DOCUMENTS

| | | |
|---|---|---|
| 2,728,702 A | 12/1955 | Simon |
| 3,596,979 A | 8/1971 | Hermann |

FOREIGN PATENT DOCUMENTS

| | | |
|---|---|---|
| DE | 1605041 | 5/1972 |
| DE | 7929367 | 10/1979 |
| DE | 3345576 | 6/1985 |
| DE | 3722873 | 4/1989 |
| DE | 3939534 A1 | 6/1991 |
| DE | 3939534 | 6/1991 |
| DE | 4106888 | 9/1991 |
| DE | 4232953 A1 | 10/1993 |
| DE | 4439827 A1 | 9/1995 |
| DE | 19632055 | 11/1997 |
| EP | 0392904 | 10/1990 |
| EP | 511157 | 3/1992 |
| WO | WO83/00840 | 3/1983 |
| WO | WO97/10950 | 3/1997 |

OTHER PUBLICATIONS

Ubelegungen Zum GroBserieneinsatz von Sandwichbauteilen deren Auslegung und Gestaltung an Beispiel der Motorhaube des AUDI–Forschungsauto by M. Uebelstadt, Audi NSU Auto Union AG, Ingolstadt, Feb. 9, 1983, pp. 167–178.

*Primary Examiner*—Terrel Morris
*Assistant Examiner*—Hai Vo
(74) *Attorney, Agent, or Firm*—Stevens, Davis, Miller & Mosher, LLP

(57) ABSTRACT

A flat composite body with an asymmetric laminar structure generally consisting of a first layer of material, a foam core intermediate layer and a decorative second layer of non-metallic material, wherein a fleece with an epoxy binder is placed between the first and intermediate layers and a fiber matting with an epoxy binder is placed between the intermediate layer and the second layer.

14 Claims, 2 Drawing Sheets

FLAT COMPOSITE BODY, ESPECIALLY A MOTOR VEHICLE BODY ELEMENT

Figure 1:
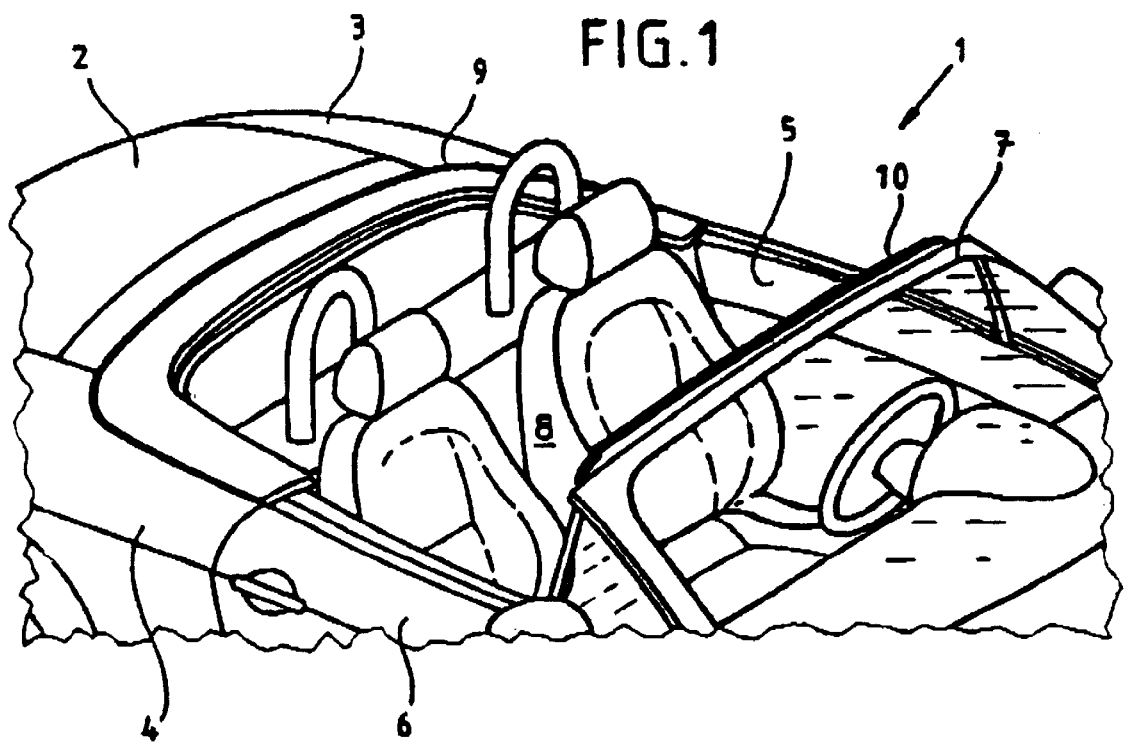

The invention relates to a flat composite body as a vehicle body element with an asymmetric laminar structure consisting of a first outer layer of an aluminum material, a steel sheet, or a sintered metal sheet, also consisting of an intermediate layer, in particular a foam core, and a second inner layer of a non-metallic material.

The invention also relates to a process for manufacture of such a flat composite body.

A generic composite body and accordingly a process for manufacture of such composite body is known from the essay "Considerations relating to large-series use of sandwich components, their design and configuration, based on the example of the AUDI research vehicle hood" in the series of status BMFT [German Federal Ministry of Research and Technology] status reports 'Development trends for motor vehicles and fuels,' Research Survey 1982, pages 167–177, published by TÜV Rheinland. The essay concerns itself with light-weight construction in a sandwich design, using a motor vehicle hood as an example. Design, configuration, and manufacturing considerations indicate the possibilities and limits of this light-weight construction principle. Various exemplary embodiments are shown on pages 171 and 172 in connection with the laminar design. In one of the embodiment examples the cover layers consist of aluminum or laminated sheet metal and plastic. This results in an asymmetrical laminar design. The core consists preferably of Structhan (thermoreactive, foamed, fiberglass-reinforced plastic of variable specific gravity). Structhan assumes the function of stress equalization (prevention of warping).

DE 39 534 C2 describes a process and a support mould for manufacture of plates and platelike articles such as doors, in particular refrigerator doors. An asymmetric laminar design is created in this instance as well, with a sheet metal covering layer on one side and a sheet plastic covering layer on the other and a hard cellular material expanded in situ from a liquid reaction mixture between these two layers. An effort is made to counter the danger of warping due to different thermal expansion coefficients by subjecting the sheet metal cover layer and/or the sheet plastic cover layer before expansion to one of the preshaping processes which offsets and counteracts the warping which occurs during cooling. The warping that occurs is not subject to calculation and must be determined empirically.

For the sake of clarity, reference is made to WO 83/00840 which describes a composite body, in particular a composite plate for the construction of ship walls, container walls or the like with a double-sided rigid outer layer, a one-part or multi-part foam-core and fiber-reinforced intermediate layers made of fiberglass or the like between each outer layer and core as well as hardened plastic for connecting the entire arrangement. Thereby a symmetrical design is achieved in which each outer layer consists of a material with a compressive strength of approximately at least that of high-grade aluminum.

On this basis the object of the invention is to prepare a flat composite body as a vehicle body element with an asymmetrical laminar structure of low weight accompanied by high dimensional stability and high rigidity, along with good paintability.

The solution claimed for the invention lies in a flat composite material asymmetric in structure having the characteristics specified in claim 1. Claim 7 specifies a process especially well suited for manufacture of such a material.

Advantageous configurations and developments of the invention are specified in the relevant subsidiary claims.

The invention is explained in detail with reference to an embodiment of such a flat composite material, an especially well suited instance of application of which is a self-contained passenger car body part such as a hardtop.

In the drawings

Figure 2:
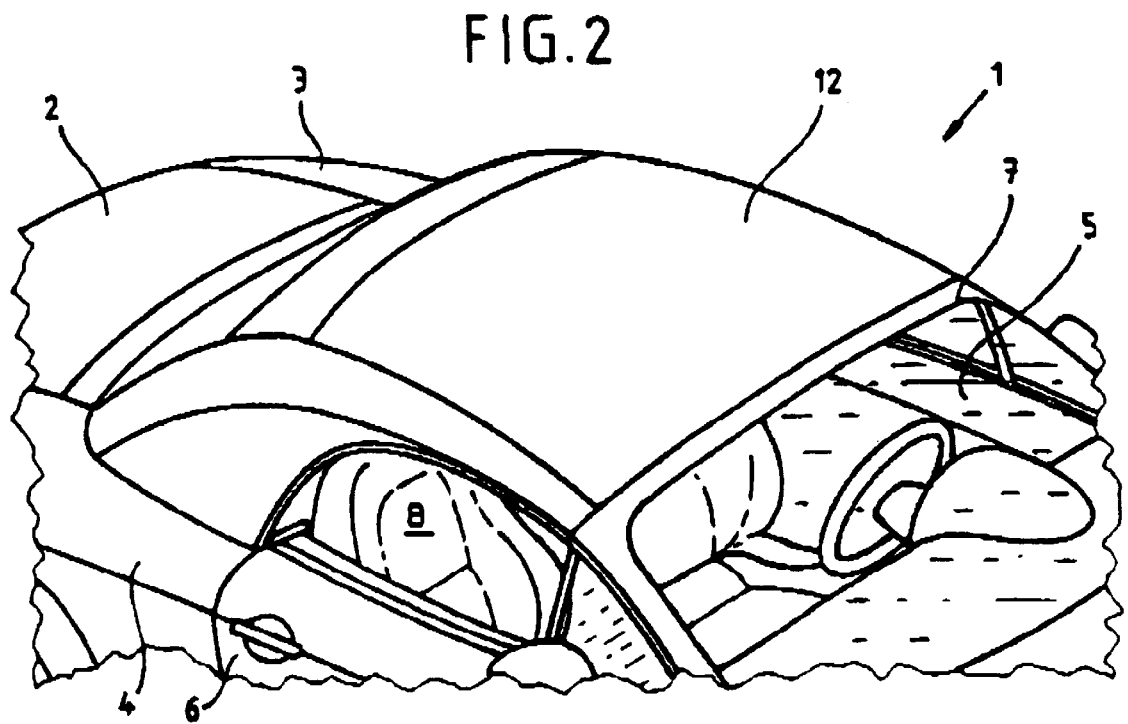
Figure 3:
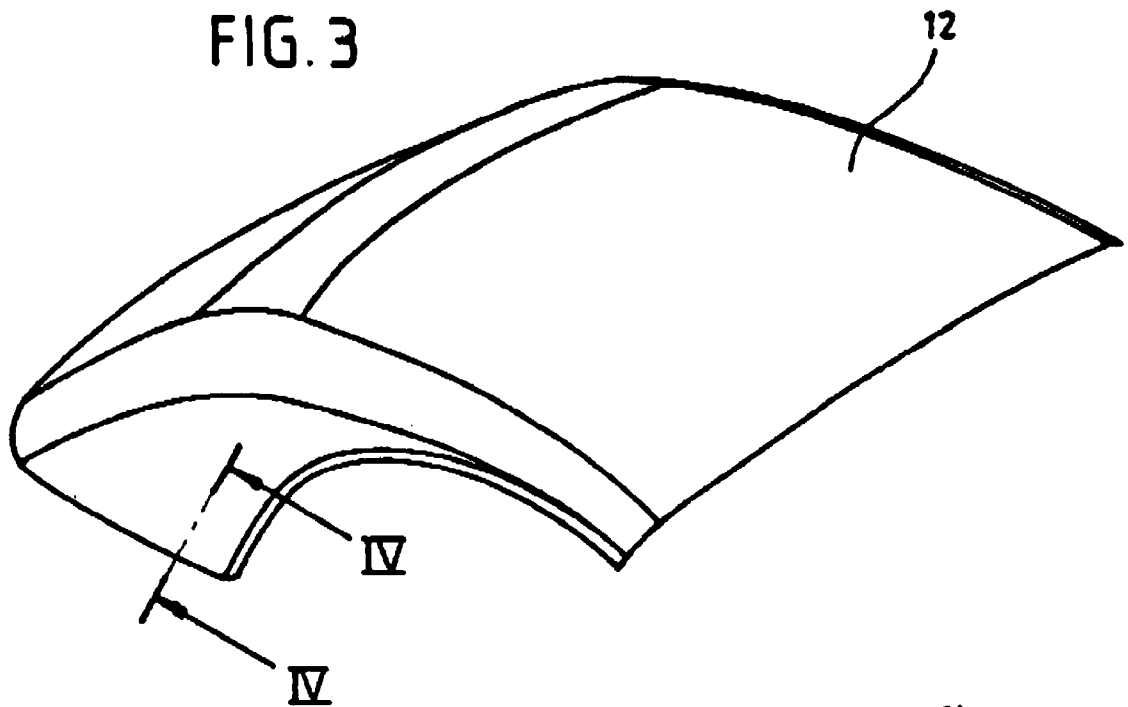

FIG. 1 shows a passenger car without hardtop,

FIG. 2 the same motor vehicle with hardtop installed,

FIG. 3 the hardtop isolated, and

Figure 4:
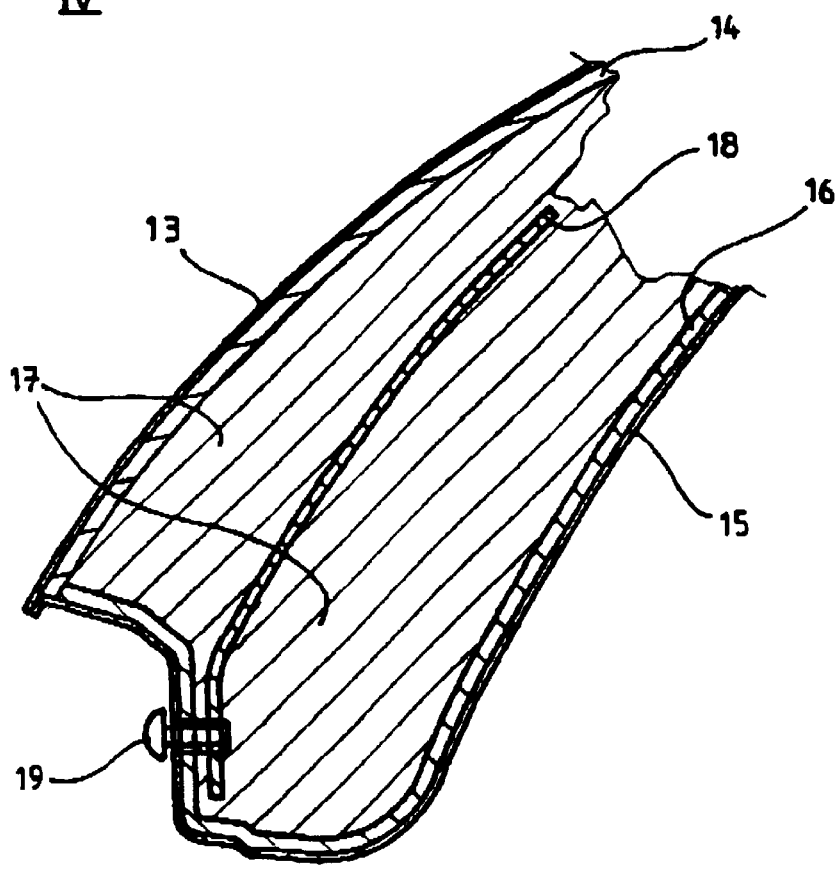

FIG. 4 a sectional diagram of the hardtop along lines IV in FIG. 3.

FIG. 1 presents a sectional view of a passenger car 1 with trunk lid 2, left and right rear fenders 3, 4, left and right vehicle doors 5, 6, and windshield frame 7. A passenger compartment 8 corresponding to a convertible is open at the top.

A continuous receiving and fastening mechanism 9 is provided on the edges of the trunk lid 2 and the fenders 3, 4 facing the passenger compartment 8. A corresponding receiving and fastening mechanism 10 extends along the upper, horizontally positioned, section of the frame 7. Both receiving and fastening mechanisms 9, 10 perform the function of receiving a hardtop 12 as shown in FIG. 2, so that the passenger compartment 8 may now be closed at the top. Hence the hardtop 12 may be installed or removed as desired, so that the passenger car 1 may be driven optionally with the corresponding equipment.

For the sake of clarity the hardtop 12 is again shown separately in FIG. 3, while the laminar structure of this asymmetric flat composite element is to be seen in FIG. 4. The outer layer 13 is made of a preformed blank of an aluminum material; in this instance as well use may be made of sheet steel or a sintered metal, for example. Adjoining this outer layer 13 is nonwoven polyester material (fleece) 14 provided with an expanded epoxy resin bonding agent. An inner layer 15 on the passenger compartment side is in the form of decorative material next to which in turn is fiber matting 16 provided with an expanded epoxy resin bonding agent. The cavity is filled with a polyurethane (PU) foam core 17; consideration may also be given to use of an EPS core, other light foam materials (polypropylene, etc), or a core of blown glass with bonding agent. Inserts 18, for example ones also of a an aluminum material, may be provided at suitable points inside the cavity and may be connected to the outer or inner layer 13, 15 by means of a screw connection 19.

The flat composite material, the hardtop 12 shown in the exemplary embodiment, consists preferably of a metal surface, nonwoven polyester material (fleece) which may be a common commercial product such as is used in kitchen vapor filters, a foam core of average density (approximately 20 kg/m$^3$ to approximately 100 kg/m$^3$), fiber matting (randomly distributed chopped glass fiber matting with a finish preferably suited for epoxy resins, optionally containing a thermoplastic binder for thermal deformation), and a decorative multilayer foil, preferably with a PUR barrier layer. Suitable as decorative foil materials in particular are thermoplastic foils with an integrated barrier layer (intended to prevent foam breakthrough in press compaction), but also natural products such as leather, for example, if it withstands a foam pressure of about 1.5 bar without breakthrough. Nonwoven polyester and staple fiber matting are additionally moistened with expanding epoxy resin.

The specific laminar structure is presented below:

Sheet aluminum (alkaline cleaned); sheet thickness 1.1 mm

Polyester fleece, 300 g/m²

PU foam core with sg (specific gravity) approximately 54 kg/m³

Chopped glass strand fiber mat: 450 g/m²

Polyurethane decorative fabric: 70 μm foil barrier, whereby an expanding matrix system acting as binder, with a reactive resin mass (total amount of resin+hardener+propellant) of 1600 g/m² (outer) and approx. 1300 g/m² (inner) is further specified as follows:

Resin: Araldit®LY 5054 (made by Ciba Spezialitätenchemie AG, Basel)+1% propellant Hardener: XB 5003-1® (made by Ciba Spezialitätenchemie AG, Basel)

Propellant: DY 5054® (made by Ciba Spezialitätenchemie AG, Basel)

Mixture ratio: 100:20% by weight components, whereby it is possible to expand the reactive resin mixture and the resulting foam does not collapse when the separating agent, based on PAT® 921/A, made by the Würtz Company, is used.

In theory all liquid epoxy resin systems which can react to a hardener/hardener mixture are suitable as an expanded matrix system serving as bonding agent. Preference is given for this purpose to bisphenol epoxy resins such as bisphenol-A and bisphenol-A/F epoxides modified with stabilizers and thixotropic agents. Also suitable are glycidyl ethers of aliphatic alcohols or polyalkylene glycol, as well as solid epoxy resins which may be processed in the liquid state when mixed with a liquid epoxy resin; bisphenol-A epoxy resins, for example, may be employed as solid epoxy resins.

Theoretically all known liquid hardeners may be used as hardeners, for example, aliphatic, cycloaliphatic amines and their adducts with epoxides, for example, as well as polyamide amines. Other additives which promote hardening, e.g., tertiary amines, may be used in the mixtures, depending on the epoxy resin systems.

The fleece to be used in accordance with the invention serves the purpose of so-called back tension which equalizes stresses resulting from asymmetry. Consequently, the fleece must vanish during the hardening process. Examples of fleeces are thermoplastic fleeces, with fleeces made of thermoplastic polyesters being preferred. Theoretically all common fibers such as those of glass, carbon, kevlar, and natural fibers may be used. Glass strand fibers present the advantage that they can be thoroughly mixed with foam; in theory all fiber glass fabrics and complexes may be used.

The following process is carried out in manufacture of the flat composite material (hardtop 12) claimed for the invention.

First the outer layer 13, such as an aluminum plate, is worked with a suitable deep-drawing die into the subsequent shape of the hardtop 12 and the edge outlines are then cut (by laser cutting, for example). The surface of the blank is then subjected to alkaline degreasing to improve adhesion. The alkaline degreasing consists preferably of the steps represented by degreasing, rinsing, caustic passivation, rinsing, drying. The process may be continued with cataphoresis priming, optionally in the dipping process (KTL), in addition to anticorrosive coating such as zinc phosphating.

The PU foam core 17 provided between the inner and outer layers 13, 15 is foamed in a suitable tool before the individual composite layers are assembled and bonded. The foam blank is then wrapped in fiber matting 16 and fleece 14 and wetted with expanding epoxy resin.

To bond the individual layers together and accordingly produce the hardtop 12 in a single operation a suitable compression molding die is used to introduce the preformed outer layer 13 into the die matrix, the inner layer 15 (decorative layer) is stretched over the die stamp, and the foam core 17, positioned opposite the outer layer 13, is also inserted into the die matrix. The die mold is then closed by appropriate movement of the stamp accompanied by pressing of the individual layers and simultaneous hardening.

Since the expansion relationships among the individual layers have been coordinated with each other, a dimensionally stable composite material is obtained. Stability of shape is achieved especially when epoxy resin is used in that no contraction occurs in the liquid phase as a result of expansion except for the negligible cooling contraction. The volume of the foam system must be maintained until jelling takes place.

Experiments have been conducted which show it to be advantageous if the compressive molding dies are at a temperature of approximately 40 to 50° during pressing of the individual components of the flat composite material. Good results have been obtained with a pressing time of around 60 minutes. Other temperatures and pressing times are conceivable. The compressive molding dies should be suitably adjustable.

The result obtained is a flat composite material possessing the advantages indicated above, along with good paintability of the metal surface (outer layer 13).

It is also possible during the manufacturing process to build hollow pipes for later cabling in the cavity later filled with PU foam core. Fastening elements such as bolt-on plates or inserts may also be used. Nor is the invention restricted to the application (hardtop) indicated in the exemplary embodiment. Application for other vehicle elements, including ones for rail vehicles and for decorative design elements, spherically shaped facade elements, elements for construction of fairs and exhibitions, and the like, is also conceivable.

This process may be used in particular wherever a metal surface is needed and low component weight is an advantage. Examples are machine building (moving masses), boat building, aircraft, athletic equipment, interior finishing, panels, facades, furniture, etc.

What is claimed is:

1. A flat composite body with an asymmetric laminar structure comprising:

a first layer of metallic material;

a foam core intermediate layer; and a decorative second layer of non-metallic material;

wherein a fleece with an epoxy binder is placed between the first and intermediate layer and a fiber matting with an epoxy binder is placed between the intermediate layer and the second layer.

2. The flat composite body according to claim 1 wherein the first layer is an aluminum plate, the fleece is polyester, the foam core intermediate layer has a medium density of 20 kg/m³ to 100 kg/m³ and the second layer has a decorative multi-layer foil with a barrier foil.

3. The flat composite body according to claim 1 wherein:

the first layer is an aluminum plate having a thickness of about 1.1 mm;

the fleece is made of polyester and has a mass per square meter of 300 g/m²;

the intermediate layer is made of a polyurethane foam core having a specific gravity of 54 kg/m³;

the fiber matting is chopped glass having a mass per square meter of 450 g/m²; and the second layer is a polyurethane decorative fabric having a 70 μm barrier;

wherein an expanding matrix system is used as the epoxy binder to bind layers together having a reactive resin mass of 1600 g/m$^2$ between the first layer and the polyester fleece and a reactive resin mass of 1300 g/m$^2$ between the second layer and the fiber matting and the polyurethane foam core does not collapse with the use of a separating agent.

4. The flat composite body according to claim 1 wherein the intermediate layer is made of a polypropylene or an EPS core.

5. The flat composite body according to claim 1 wherein the intermediate layer is made of blown glass with a binder.

6. The flat composite body according to claim 1 wherein the first layer is made of a steel plate or sintered metal.

7. The flat composite body according to claim 1 wherein inserts are connected one or both of the first and second layers and extend into the intermediate layer.

8. The flat composite body according to claim 7 wherein the inserts are made of empty pipes, rods, or plates.

9. The flat composite body according to claim 1 wherein the fleece is a kitchen vapor filter, thermoplastic polyester, or woven fabric.

10. The flat composite body according to claim 9 wherein fibers of the fleece are made of glass, carbon, kevlar, or natural fibers.

11. The flat composite body according to claim 1 wherein the second decorative layer is made of a thermoplastic foil with an integrated barrier foil.

12. The flat composite body according to claim 1 wherein the second decorative layer is leather.

13. The flat composite body according to claim 1 wherein the epoxy binder comprises a bisphenol epoxy resin with stabilizers and thixotropic agents.

14. The flat composite body according to claim 1 wherein the epoxy binder comprises a glycidyl ether of alophatic alcohols or polyalkylene glycol.

* * * * *